(12) United States Patent
Bang

(10) Patent No.: US 9,855,954 B2
(45) Date of Patent: Jan. 2, 2018

(54) SHIFT CONTROL APPARATUS AND METHOD OF VEHICLE

(71) Applicant: HYUNDAI MOTOR COMPANY, Seoul (KR)

(72) Inventor: Jae Sung Bang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/271,416

(22) Filed: Sep. 21, 2016

(65) Prior Publication Data

US 2017/0334447 A1    Nov. 23, 2017

(30) Foreign Application Priority Data

May 17, 2016    (KR) .................. 10-2016-0060034

(51) Int. Cl.

| | |
|---|---|
| *F16H 61/68* | (2006.01) |
| *B60W 30/19* | (2012.01) |
| *B60W 10/02* | (2006.01) |
| *B60W 10/06* | (2006.01) |
| *B60W 10/08* | (2006.01) |

(Continued)

(52) U.S. Cl.
CPC ............ *B60W 30/19* (2013.01); *B60W 10/02* (2013.01); *B60W 10/06* (2013.01); *B60W 10/08* (2013.01); *B60W 10/113* (2013.01); *B60W 20/15* (2016.01); *F16H 61/68* (2013.01); *B60W 2510/104* (2013.01); *B60W 2510/1005* (2013.01); *B60W 2510/1095* (2013.01); *B60W 2710/021* (2013.01); *B60W 2710/025* (2013.01); *B60W 2710/0644* (2013.01);

(Continued)

(58) Field of Classification Search
None
See application file for complete search history.

(56) References Cited

U.S. PATENT DOCUMENTS

| | | | | |
|---|---|---|---|---|
| 6,819,997 | B2* | 11/2004 | Buchanan ............. | B60W 10/06 477/70 |
| 6,832,978 | B2* | 12/2004 | Buchanan ............. | B60W 10/02 477/174 |

(Continued)

FOREIGN PATENT DOCUMENTS

| | | |
|---|---|---|
| JP | 5190720 B2 | 2/2013 |
| JP | 5338775 B2 | 11/2013 |

(Continued)

*Primary Examiner* — Dirk Wright
(74) *Attorney, Agent, or Firm* — Brinks Gilson & Lione

(57) ABSTRACT

The present disclosure relates to a shift control apparatus of a vehicle and its method. In particular, the shift control apparatus includes: a transmission including a first clutch and a second clutch; a torque source to generate power for driving a vehicle; a data detector to detect a vehicle state data; and a vehicle controller to connect a current stage synchronizer to a next stage driving gear if the vehicle state data satisfy a shift condition, release the first clutch to be connected to the driving gear of a current stage, perform a speed control of a torque source while maintaining the second clutch connected to the driving gear of the next stage in a slip state, and release the second clutch and connect the first clutch if the vehicle stage data satisfy a speed control completion condition to complete a shift to a target stage.

20 Claims, 12 Drawing Sheets

(51) Int. Cl.
   *B60W 10/113*   (2012.01)
   *B60W 20/15*   (2016.01)
(52) U.S. Cl.
   CPC .............. *B60W 2710/081* (2013.01); *B60W 2710/1005* (2013.01); *B60W 2710/1011* (2013.01); *Y10S 903/93* (2013.01)

(56) References Cited

U.S. PATENT DOCUMENTS

| | | | | |
|---|---|---|---|---|
| 6,949,051 B2* | 9/2005 | Katakura | ............ | F16H 61/0437 477/175 |
| 7,086,989 B2* | 8/2006 | Siebigteroth | ......... | F16H 61/061 477/109 |
| 7,314,427 B2* | 1/2008 | Sakai | ................. | F16H 57/0006 477/116 |
| 7,455,619 B2* | 11/2008 | Jiang | .................... | B60W 10/02 477/176 |
| 7,478,572 B2* | 1/2009 | Maten | .................. | F16H 61/688 74/331 |
| 7,779,714 B2* | 8/2010 | Baldwin | ......... | B60W 30/18027 477/116 |
| 8,079,936 B2* | 12/2011 | MacFarlane | ............ | F16D 48/06 477/107 |
| 8,150,586 B2* | 4/2012 | Dlugoss | .............. | F16H 61/0403 701/51 |
| 8,257,225 B2* | 9/2012 | Marcigliano | ......... | B60W 10/02 477/78 |
| 8,328,688 B2* | 12/2012 | Fujii | ..................... | F16H 61/061 477/155 |
| 8,387,479 B2* | 3/2013 | Ogami | ................ | F16H 61/0213 477/77 |
| 8,775,044 B2* | 7/2014 | Teslak | ..................... | F16H 59/16 701/67 |
| 9,327,733 B2* | 5/2016 | Abington | ................ | F02D 29/02 |
| 9,605,731 B2* | 3/2017 | Lee | ......................... | F16H 3/091 |

FOREIGN PATENT DOCUMENTS

| | | |
|---|---|---|
| JP | 2014-065357 A | 4/2014 |
| JP | 2015-121294 A | 7/2015 |
| KR | 10-2015-0134501 A | 12/2015 |

* cited by examiner

SHIFT CONTROL APPARATUS AND METHOD OF VEHICLE

CROSS-REFERENCE TO RELATED APPLICATION

This application claims priority to and the benefit of Korean Patent Application No. 10-2016-0060034, filed on May 17, 2016, the entire contents of which are incorporated herein by reference.

FIELD

The present disclosure relates to a shift control apparatus and method of a vehicle.

BACKGROUND

The statements in this section merely provide background information related to the present disclosure and may not constitute prior art.

An automatic transmission changes a gear ratio depending on a driving state of a vehicle to automatically perform a shift to a target shift stage.

When the shift to the target shift stage is performed, an off-coming friction element released in an operating state and an on-coming friction element changed from the releasing state to the operating state are present in the automatic transmission, and the releasing and the coupling of the off-going friction element and the on-coming friction element are performed by controlling an oil pressure supplied to each friction element. Further, the control of the oil pressure supplied to the off-coming friction element and the on-coming friction element is performed by operating a control duty to control a solenoid valve.

Generally, a shift control method uses slips of the off-coming friction element and the on-coming friction element to synchronize a speed of an input shaft of the automatic transmission with a speed of an output shaft thereof. However, a method for manually synchronizing a speed of an input shaft with a speed of an output shaft using a slip has a problem in that a shift time is long and shift quality is changed in response to a driving state (e.g., slope of a road, vehicle load, or the like).

Further, a hybrid vehicle does not use a torque converter for improvement in fuel efficiency, and therefore drivability of the hybrid vehicle may be adversely affected when the shift quality is not good.

The above information disclosed in this Background section is only for enhancement of understanding of the background of the present disclosure and therefore it may contain information that does not form the prior art that is already known to a person of ordinary skill in the art.

SUMMARY

The present disclosure provides a shift control apparatus and a method of a vehicle having advantages of synchronizing an input shaft speed of a transmission with an output shaft speed thereof by controlling a torque source speed.

In addition, the present disclosure provides a shift control apparatus and a method of a vehicle having advantages of maintaining a transfer torque in a kick down shift section and a real shift section.

One form of the present disclosure provides a shift control apparatus of a vehicle, including: a transmission configured to include a first clutch and a second clutch; a torque source configured to generate power for driving the vehicle; a data detector configured to detect a vehicle state data to control the transmission; and a vehicle controller configured to connect a synchronizer to a driving gear of a next stage to a current stage if the vehicle state data satisfy a shift condition, release the first clutch to be connected to the driving gear of the current stage, perform a speed control of a torque source while maintaining the second clutch connected to the driving gear of the next stage in a slip state, and release the second clutch and connect the first clutch if the vehicle stage data satisfy a speed control completion condition to complete the shift to a target stage.

The vehicle controller may use an inertia and a target speed of an input shaft of the transmission to generate a set value and increase and reduce an input shaft torque of the transmission based on the set value to prepare the speed control of the torque source.

The vehicle controller may generate an input shaft speed at a target stage at time when the speed control of the torque source starts, use the input shaft speed and the torque source speed at the target stage to generate an initial offset, split the initial offset to generate an offset input, and interpolate the offset input to generate the interpolated offset input.

The vehicle controller may set target timing based on the initial offset, split a section from the time when the speed control of the torque source starts from a target time into a plurality of sub sections, and set a slope of the offset input corresponding to the plurality of sub sections, respectively.

The vehicle controller may use at least one of the target speed of the torque source, a current speed of the torque source, and the inertia of the input shaft of the transmission to generate at least one of a feedback control input, a feed forward control input, and an unknown term control input and use at least one of the feedback control input, the feed forward control input, and the unknown term control input to generate a torque command.

The vehicle controller may use an output speed and a gear ratio of the transmission to generate the speed of the input shaft connected to the first clutch and release the second clutch and connect the first clutch if a difference value between the speed of the torque source and the speed of the input shaft connected to the first clutch is equal to or less than a first reference value.

The vehicle controller may use an output speed and a gear ratio of the transmission to generate an acceleration of the input shaft connected to the first clutch and releases the second clutch and connect the first clutch if a difference value between an acceleration of the torque source and the acceleration of the input shaft connected to the second clutch is equal to or less than a second reference value.

Another form of the present disclosure provides a shift control method of a vehicle including: determining whether to satisfy a shift condition based on vehicle state data; connecting a next stage synchronizer and releasing a first clutch connected to a current stage driving gear, if the shift condition is satisfied; releasing a current stage synchronizer and coupling a target stage synchronizer; generating a target speed of the torque source while maintaining a second clutch connected to a next stage driving gear in a slip state; performing a speed control of the torque source by using the target speed of the torque source; determining whether to satisfy a speed control completion condition; and releasing a second clutch connected to the next stage driving gear and connecting a first clutch connected to the target stage driving gear, if the speed control completion condition is satisfied.

According to an exemplary form of the present disclosure, the input shaft speed and the output shaft speed of the transmission may be synchronized by controlling the torque source speed to implement the coaxial shift, thereby shortening the shift time and the shift may be performed using the acceleration, thereby improving the shift quality.

The transfer torque may be generated by the slip to perform the shift, thereby inhibiting or preventing the power interruption during the shift and improving the fuel efficiency.

Further, the effects which may be obtained or predicted by the exemplary form of the present disclosure will be directly or implicitly disclosed in the detailed description of the exemplary forms of the present disclosure. That is, various effects which are predicted by the exemplary forms of the present disclosure will be disclosed in the detailed description to be described below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
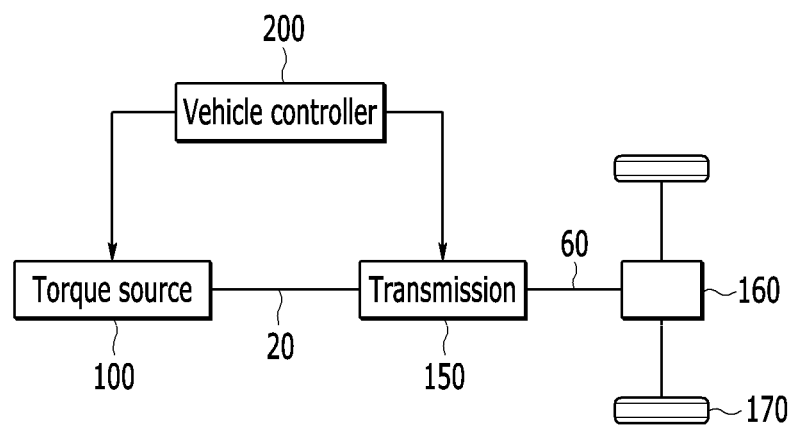
FIG. 1 is a diagram illustrating a vehicle to which a shift control apparatus according to one form of the present disclosure is applied.

The drawings described herein are for illustration purposes only and are not intended to limit the scope of the present disclosure in any way.

DESCRIPTION OF SYMBOLS

| | |
|---|---|
| 100: Torque source | 110: Engine |
| 115: HSG | 120: Engine clutch |
| 130: Driving motor | 150: Transmission |
| 200: Vehicle controller | 410: Data detector |
| 430: Actuator | |

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in describing below exemplary forms of the present disclosure, well-known functions or constructions will not be described in detail since they may unnecessarily obscure the understanding of the present disclosure. Further, the following terminologies are defined in consideration of the functions in the present disclosure and may be construed in different ways by the intention of users and operators, practice, or the like. Therefore, the definitions thereof should be construed based on the contents throughout the specification.

Further, to effectively describe core technical features of the present disclosure, terms may be appropriately changed, integrated, or separated for those skilled in the art in a technical field to which the present disclosure belongs to explicitly understand the present disclosure, but the present disclosure is not limited thereto.

Referring to FIG. 1, a vehicle to which a shift control apparatus is applied includes a torque source 100, a transmission 150, a differential gear apparatus 160, a driving wheel 170, and a vehicle controller 200.

The torque source 100 generates power for driving a vehicle. In the case of an internal combustion engine vehicle using only power of an engine, the torque source 100 may include only an engine. In the case of a hybrid vehicle using the power of the engine and power of a driving motor efficiently combined, the torque source 100 may include the engine and the driving motor. In the case of an electric vehicle and a fuel cell vehicle using only the power of the driving motor, the torque source may include only the driving motor.

The transmission 150 adjusts a gear ratio according to a control of the vehicle controller 200 and transfers an output torque of the torque source 100 to the driving wheel 170, thereby driving a vehicle.

The transmission 150 may be a dual clutch transmission (DCT). This will be described in more detail with reference to FIG. 3.

The vehicle controller 200 is a controller that controls a general operation of a vehicle. The vehicle controller 200 is connected to the torque source, the transmission 150, the differential gear apparatus 160, and the driving wheel to control at least one of the torque source 100, the transmission 150, the differential gear apparatus 160, and the driving wheel 170, thereby driving the vehicle.

In connection with the power transfer of the vehicle, power generated from the torque source 100 is transferred to an input shaft 20 of the transmission 150 and power output from an output shaft 60 of the transmission 150 is transferred to a vehicle shaft via the differential gear apparatus 160. The vehicle shaft rotates the driving wheel 170, and thus the power generated from the torque source 100 drives the vehicle.

Figure 2:
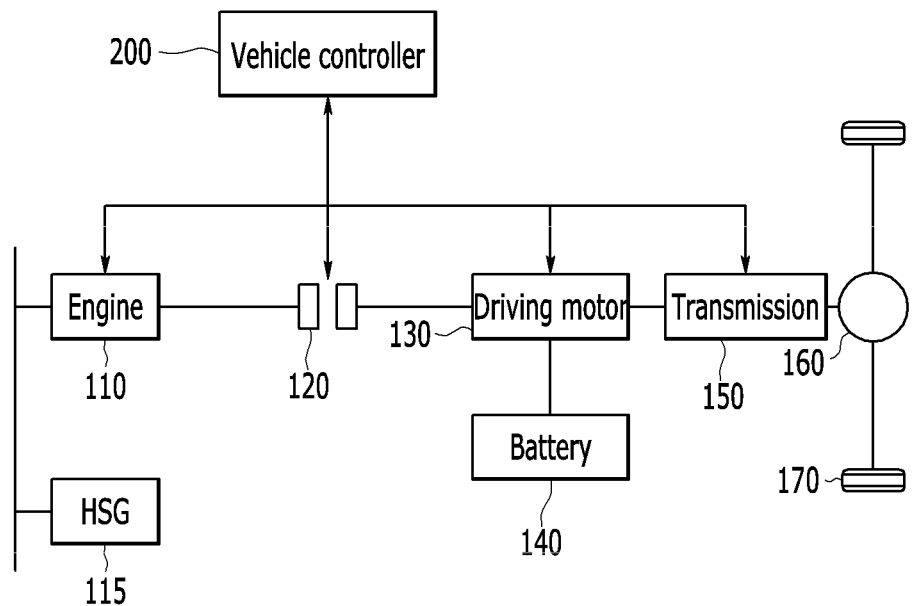
FIG. 2 is a diagram illustrating a hybrid vehicle to which the shift control apparatus according to the present disclosure is applied.

Referring to FIG. 2, a hybrid vehicle to which the shift control apparatus is applied includes: an engine 110, a hybrid starter & generator (HSG) 115, an engine clutch 120, a driving motor 130, a battery 140, the transmission 150, the differential gear apparatus 160, the driving wheel 170, and the vehicle controller 200.

The engine 110 combusts fuel to generate power. The engine 110 may be various kinds of known engines 110 like a gasoline engine, a diesel engine, or the like using fossil fuel.

The HSG 115 starts the engine 110 and is operated as a generator in a state in which the engine 110 starts, thereby generating electric energy.

The driving motor 130 may be operated by a three-phase AC voltage to generate a torque. The driving motor 130 is operated as a generator upon coasting or regenerative braking to supply a voltage to the battery 140.

The engine clutch 120 is disposed between the engine 110 and the driving motor 130 and is operated according to the control of the vehicle controller 200 to cut off the power transfer between the engine 110 and the driving motor 130. That is, the engine clutch 120 connects or cuts off power between the engine 110 and the driving motor 130 according to the conversion between an electric vehicle (EV) mode and a hybrid electric vehicle (HEV) mode or a conversion between an engine mode and the HEV mode.

The battery 140 includes a plurality of unit cells and stores a high voltage for providing a driving voltage to the driving motor 130. The battery 140 supplies the driving voltage to the driving motor 130 in the EV mode or the HEV mode and is charged with a voltage generated from the driving motor 130 upon the regenerative braking.

When a commercial power supply is plugged in, the battery 140 may also be charged with a voltage and a current supplied through a charging apparatus.

The transmission 150 adjusts the gear ratio according to the control of the vehicle controller 200 and distributes the output torques summed and applied through the engine clutch 120 according to an operating mode on the basis of the gear ratio to transfer the distributed output torque to the driving wheel 170, thereby driving the vehicle.

The transmission 150 may be the dual clutch transmission (DCT). This will be described in more detail with reference to FIG. 3.

The vehicle controller 200 controls at least one of the engine 110, the HSG 115, the engine clutch 120, the driving motor 130, the battery 140, the transmission 150, the differential gear apparatus 160, and the driving wheel 170. That is, the vehicle controller 200 controls the output torques of the engine 110 and the driving motor 130 according to the driving condition of the hybrid vehicle and controls the conversion between the EV mode and the HEV mode.

Figure 3:
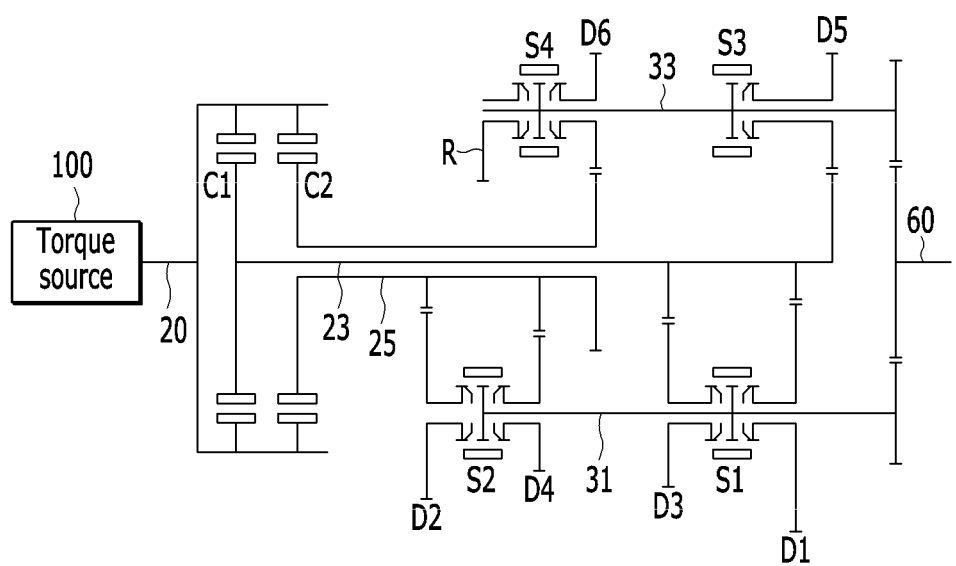
FIG. 3 is a diagram schematically illustrating a transmission illustrated in FIGS. 1 and 2.

FIG. 3 is a diagram schematically illustrating a transmission illustrated in FIGS. 1 and 2.

Referring to FIG. 3, the transmission 150 includes: first and second clutches C1 and C2, first and second input shafts 23 and 25, first to sixth stage driving gears D1, D2, D3, D4, D5, and D6, a reverse driving gear R, first and second power transfer shafts 31 and 33, first to fourth synchronizers S1, S2, S3, and S4, an output shaft 60.

The first and second clutches C1 and C2 are disposed between a main input shaft 20 and the first input shaft 23 and the second input shaft 25 that are disposed on the same shaft line as the main input shaft 20.

Further, the first and second clutches C1 and C2 serve as a power cutoff function so that the torque of the torque source 100 may be selectively transferred to the first input shaft 23 and the second input shaft 25 through the main input shaft 20.

The first and second clutches C1 and C2 may be driven by an oil pressure supplied from an actuator like the transmission or may be driven by an electric motor.

The first input shaft 23 is disposed on the same shaft line as the main input shaft 20 and is variably connected to the main input shaft 20 through the first clutch C1.

The first input shaft 23 is provided with a first input gear geared with the first stage driving gear D1 that is an odd stage, a second input gear geared with the third stage driving gear D3, and a third input gear geared with the fifth stage driving gear D5 at a predetermined interval from one another.

The second input shaft 25 is formed of a hollow shaft and is disposed to enclose the first input shaft 23 from an outer circumferential surface of the first input shaft 23.

The second input shaft 25 is provided with a fourth input gear geared with the second stage driving gear D2 that is an even stage, a fifth input gear geared with the fourth stage driving gear D4, and a sixth input gear geared with the sixth stage driving gear D6 at a predetermined interval from one another.

Therefore, when the first clutch C1 is operated, the torque is transferred to the first stage driving gear D1, the third stage driving gear D3, and the fifth stage driving gear D5 while the first input shaft 23 is rotated, and when the second clutch C2 is operated, the torque is transferred to the second stage driving gear D2, the fourth stage driving gear D4, and the sixth stage driving gear D6 while the second input shaft 25 is rotated.

The first and second power transfer shafts 31 and 33 are disposed in parallel with the first and second input shafts 23 and 25 at a predetermined interval.

The first power transfer shaft 31 is provided with a first synchronizer S1 and a second synchronizer S2.

The first synchronizer S1 is disposed between the first stage driving gear D1 and the third stage driving gear D3. The first synchronizer S1 selectively connects the first stage driving gear D1 or the third stage driving gear D3 to the first power transfer shaft 31.

The second synchronizer S2 is disposed between the second stage driving gear D2 and the fourth stage driving gear D4. The second synchronizer S2 selectively connects the second stage driving gear D2 or the fourth stage driving gear D4 to the first power transfer shaft 31.

The second power transfer shaft 33 is provided with a third synchronizer S3 and a fourth synchronizer S4.

The third synchronizer S3 is disposed at a front side of the fifth stage driving gear D5 to selectively connect the fifth stage driving gear D5 to the second power transfer shaft 33.

The fourth synchronizer S4 is disposed between the reverse driving gear R and the sixth stage driving gear D6. The fourth synchronizer S4 selectively connects the reverse driving gear R or the sixth stage driving gear D6 to the second power transfer shaft 33.

The reverse driving gear R is operationally connected to a reverse apparatus (not illustrated) to generate a reverse shift stage.

The output shaft 60 is supplied with power from the first and second power transfer shafts 31 and 33 to transfer the power to the driving wheel. Therefore, the vehicle is driven.

Meanwhile, FIG. 3 illustrates a transmission forming six forward shift stages and one reverse shift stage, but the shift control apparatus according to the present disclosure is not restrictively applied to a structure of the transmission illustrated in FIG. 3.

Figure 4:
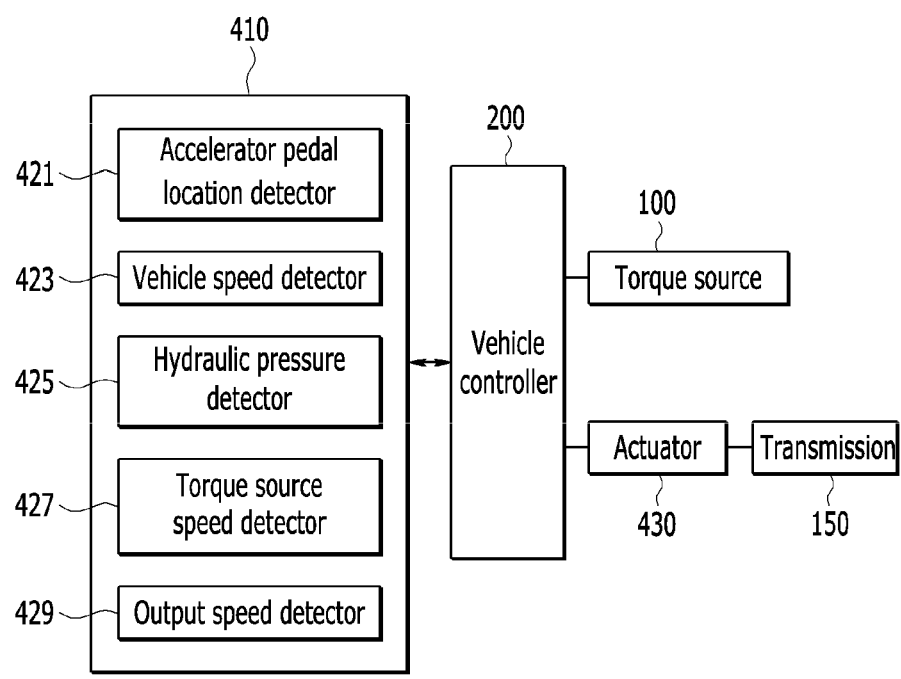
FIG. 4 is a diagram schematically illustrating a shift control apparatus for a vehicle according to one form of the present disclosure.

FIG. 4 is a diagram schematically illustrating a shift control apparatus for a vehicle according to one form of the present disclosure.

Referring to FIG. 4, the shift control apparatus of a vehicle includes a data detector 410, the vehicle controller 200, a torque source 100, and an actuator 430.

The data detector 410 provides vehicle state data detecting a state of a vehicle to the vehicle controller 200. For this purpose, the data detector 410 includes: an accelerator pedal position detector 421, a vehicle speed detector 423, a hydraulic pressure detector 425, a torque source speed detector 427, and an output speed detector 429, although other sensors or systems may be employed to detect or determine the desired data.

The accelerator pedal position detector 421 measures how much a driver presses an accelerator pedal. That is, the accelerator pedal position detector 421 measures a position value of an accelerator pedal (how much the accelerator pedal is pressed) and transfers a signal for the measured position value to the vehicle controller 200. When the accelerator pedal is completely pressed, the position value of the accelerator pedal is 100%, and when the accelerator pedal is not completely pressed, the position value of the accelerator pedal is 0%.

The vehicle speed detector 423 detects the vehicle speed and provides the detected speed to the vehicle controller 200. The vehicle speed detector 423 may be mounted in the driving wheel of the vehicle.

The hydraulic pressure detector 425 detects an oil pressure supplied to the transmission 150 and provides the detected signal to the vehicle controller 200.

The torque source speed detector 427 detects the speed of the torque source 100 and provides a signal for the detected speed to the vehicle controller 200.

The output speed detector 429 detects an output shaft speed of the transmission 150 and provides the detected signal to the vehicle controller 200.

Hereinafter, the speed of the input shaft 20 of the transmission 150 is referred as an "input shaft speed", the speed of the output shaft 160 of the transmission 150 is referred to as an "output shaft speed".

The vehicle controller 200 receives the vehicle state data detected from the data detector 410. The vehicle controller 200 determines whether to satisfy the shift condition based on the vehicle state data, and if it is determined that the shift condition is satisfied, controls the speed of the torque source 100 to perform the shift of the transmission 150.

For this purpose, the vehicle controller 200 may be implemented by at least one processor operated by a setting program, in which the setting program includes a series of commands for performing each step included in the shift control method according to the present disclosure to be described below. The shift control method will be described in more detail with reference to FIGS. 5 to 11.

The actuator 430 receives a control signal from the vehicle controller 200 to control the oil pressure supplied to the transmission 150. The actuator 430 may include at least one control valve and at least one solenoid valve that control an oil pressure applied to the clutch of the transmission 150.

Hereinafter, a shift control method of a vehicle will be described with reference to FIGS. 5 to 11. A down-shift control method will be described with reference to FIGS. 5 to 11. Meanwhile, an up-shift control method is similar to the down shift control method, and therefore the detailed description thereof will be omitted.

Figure 5:
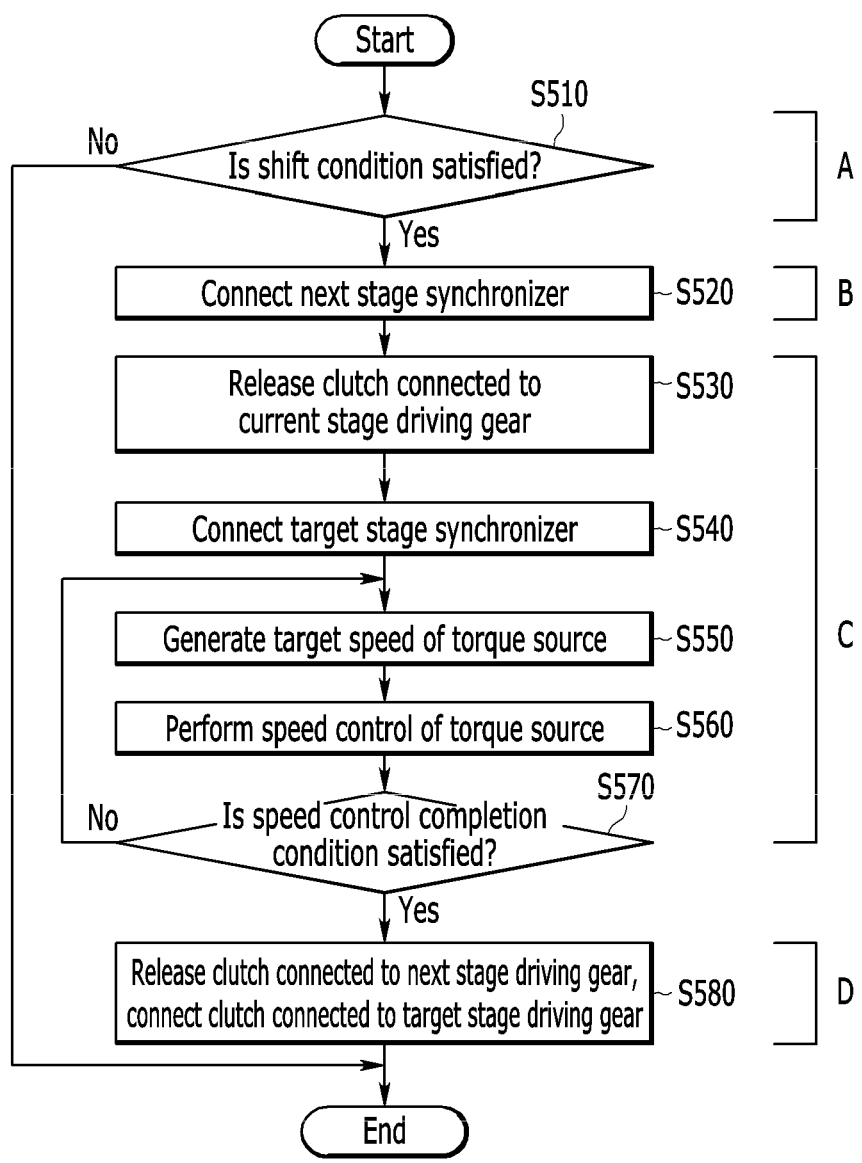
FIG. 5 is a flow chart of a shift control method of a vehicle according to one form of the present disclosure.
Figure 6:
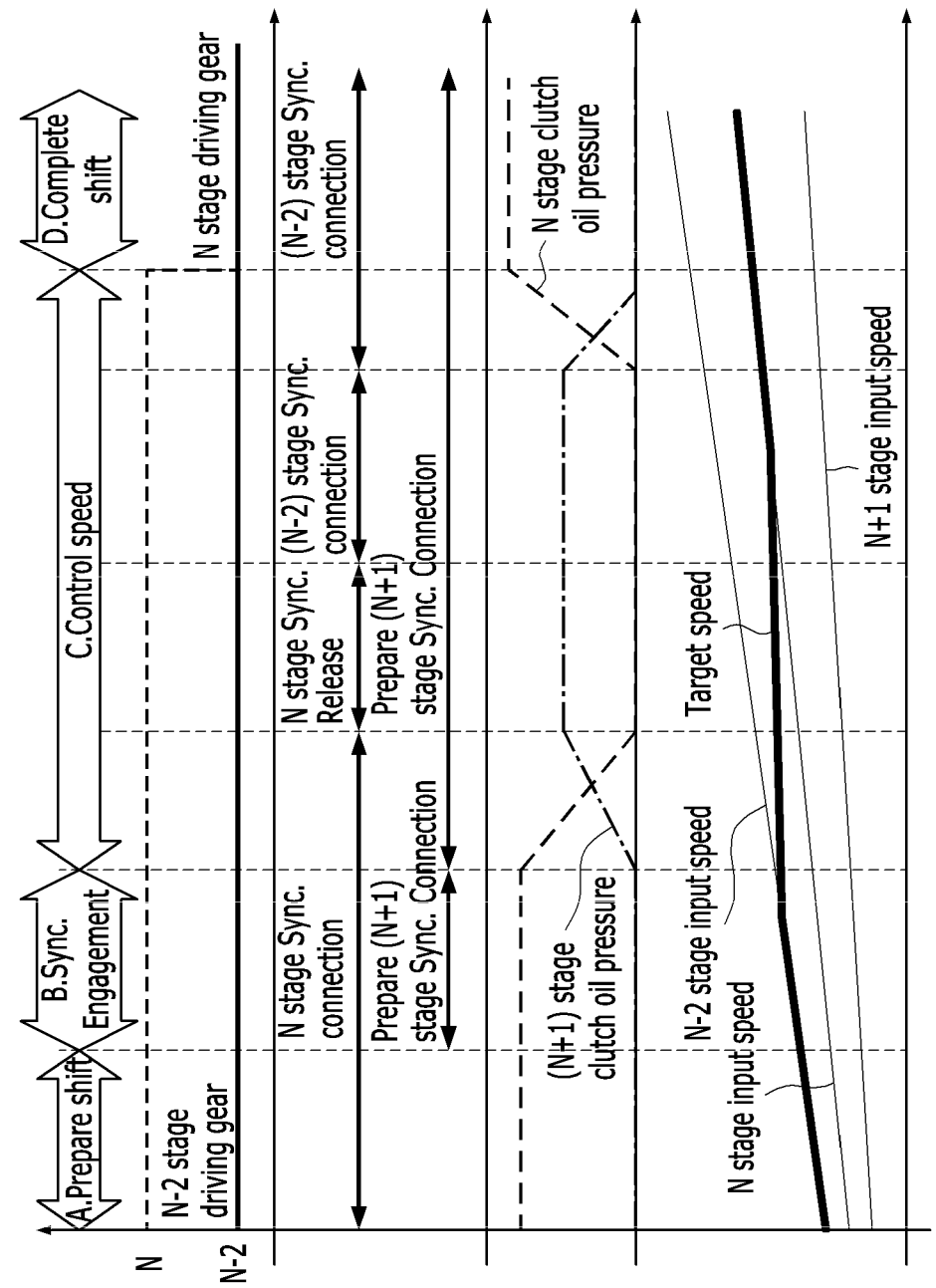
FIG. 6 is a graph for describing the shift control method according to the present disclosure.

FIG. 5 is a flow chart of a shift control method of a vehicle, and FIG. 6 is a graph for describing the shift control method.

Referring to FIGS. 5 and 6, the vehicle controller 200 determines whether the shift condition is satisfied based on the vehicle state data to prepare the shift. That is, the vehicle controller 200 may determine whether the shift condition is satisfied on the basis of the position value of the accelerator pedal provided from the accelerator pedal position detector 421 of the data detector 410 and the vehicle speed provided from the vehicle speed detector 423, although other data from the sensors may be used to determine the shift condition.

Meanwhile, if it is determined whether the shift condition is not satisfied, the vehicle controller 200 ends the shift control method. That is, the vehicle controller 200 controls the vehicle to be continuously driven at a current shift stage.

The vehicle controller 200 connects a next stage synchronizer that may connect a next stage driving gear if it determined that the shift condition is satisfied (S520). In other words, the vehicle controller 200 confirms a current shift stage engaged with the transmission if it is determined that the shift condition is satisfied and connects the next stage driving gear to the output shaft of the transmission through the next stage synchronizer. The reason of connecting the next stage synchronize is to release a clutch connected with the current stage driving gear and to transfer power to the next stage driving gear through either the first clutch C1 or the second clutch C2. In this case, the current shift stage represents the shift stage currently engaged with the transmission 150 and may be, for example, an N stage The next stage represents a next shift stage of the current shift stage and may be an N+1 stage.

Meanwhile, if the current shift stage is a sixth stage, a six-stage transmission 150 does not perform step S520 but performs a coaxial shift.

The vehicle controller 200 releases a clutch (i.e., a clutch connected to the current stage driving gear) that may transfer power to the current stage driving gear (S530). The clutch may be the first clutch C1 or the second clutch C2. Hereinafter, the clutch connected to the current stage driving gear is referred to as the "first clutch" and the clutch connected to the next stage driving gear is referred to as the "second clutch". In addition, the first clutch or second clutch can be connected to a target stage driving gear as a Dual Clutch Transmission (DCT) may transfer torque to the first stage driving gear D1, the third stage driving gear D3 and the fifth stage driving gear D5 through the first clutch C1, and also transfers the torque via the second clutch C2 to the second stage driving gear D2, the fourth stage driving gear D4 and the sixth stage driving gear D6.

The vehicle controller 200 connects a target stage synchronizer (S540). That is, the vehicle controller 200 releases a current stage synchronizer if the release of the first clutch is completed and connects the target stage synchronizer to the target stage driving gear if the release of the current stage synchronizer is completed. In this case, the target stage represents a shift stage to be shifted and may be, for example, an N−2 stage.

The vehicle controller 200 generates the target speed of the torque source 100 (S550). That is, the vehicle controller 20 generates the target speed of the torque source 10 while maintaining the second clutch connected to the next stage driving gear in the slip state. A method for generating a target speed of a torque source 100 will be described with reference to FIGS. 7 to 10.

The vehicle controller 200 uses the target speed of the torque source 100 to perform the speed control of the torque source 100 (S560). The speed control of the torque source 100 will be described in detail with reference to FIGS. 11 and 12.

The vehicle controller 200 determines whether the speed control completion condition is satisfied (S570). In detail, the vehicle controller 200 determines whether the speed control completion condition is satisfied based on the speed of the input shaft connected to the torque source 100 and the target stage driving gear or the synchronization of the acceleration.

First, when the speed control completion condition is determined on the basis of the speed, the vehicle controller 200 uses the output speed of the transmission 150 and the gear ratio of the target stage to generate the speed of the input shaft connected to the first clutch. That is, the vehicle controller 200 may perform a multiplication operation of the output speed of the transmission 150 by the gear ratio to generate the speed of the input shaft connected to the first clutch.

The vehicle controller 200 determines whether a difference value between the source of the torque source 100 and the speed of the first clutch is equal to or less than a first reference value to determine whether the speed control completion condition is satisfied.

That is, the vehicle controller 200 may determine that the speed control completion condition is satisfied when the following [Equation 1] is satisfied.

$$|W_{TS} - W_O * R_{N-2}| \leq W_1 \quad \text{[Equation 1]}$$

In the above Equation 1, $W_{TS}$ is the speed of the torque source 100, which may be confirmed by the detection of the torque source speed detector 427. $W_O$ may represent the output shaft speed of the transmission 150, $R_{N-2}$ may represent the gear ratio of the target stage, and $W_1$ may represent the first reference value. $W_1$ represents a preset value and may be set to be a value determined by a person having an ordinary skill in the art.

Further, when the speed control completion condition is determined on the basis of the acceleration, the vehicle controller 200 uses the output speed of the transmission 150 and the gear ratio of the target stage to generate a speed. That is, the vehicle controller 200 may perform a multiplication operation of the output speed of the transmission 150 by the gear ratio to generate the speed of the input shaft connected to the first clutch. The vehicle controller 200 uses the generated speed to generate the acceleration of the input shaft connected to the first clutch.

The vehicle controller 200 determines whether a difference value between the acceleration of the torque source 100 and the acceleration of the input shaft connected to the first clutch is equal to or less than a second reference value to determine whether the speed control completion condition is satisfied.

That is, the vehicle controller 200 may determine that the speed control completion condition is satisfied when the following [Equation 2] is satisfied.

$$\frac{d}{dt}(|W_{TS} - W_O * R_{N-2}|) \leq W_2 \quad \text{[Equation 2]}$$

In the above Equation 2, $W_{TS}$ may represent the speed of the torque source 100, $W_O$ may represent the output shaft speed of the transmission 150, $R_{N-2}$ represents the gear ratio of the target stage, and $W_2$ may represent the second reference value. $W_2$ represents a preset value and may be set to be a value determined by a person having an ordinary skill in the art.

Meanwhile, the vehicle controller 200 may also compare the speed of the torque source 100 for a predetermined time with the speed of the input shaft connected to the first clutch to determine the speed control completion condition.

The vehicle controller 200 releases the second clutch connected to the next stage driving gear and connects the first clutch connected to the target stage driving gear if the speed control completion condition is satisfied (S570). That is, the vehicle controller 200 controls an actuator 430 to reduce an oil pressure supplied to the second clutch connected to the next stage driving gear to approximately 0, to thereby release the second clutch and increase an oil pressure supplied to the first clutch connected to the target stage driving gear to a coupling oil pressure, to thereby connect the first clutch. In this case, the vehicle controller 200 completes the shift.

Figure 7:
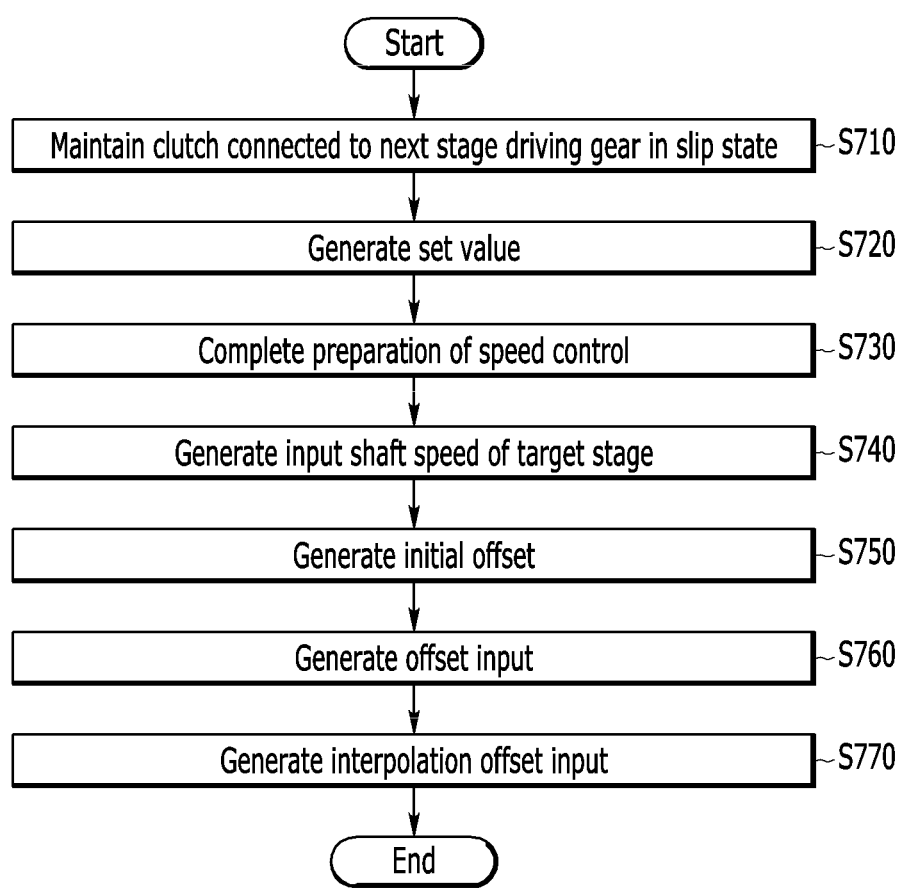
FIG. 7 is a flow chart of a method for generating a target speed of a torque source in the shift control method according to the present disclosure.
Figure 8:
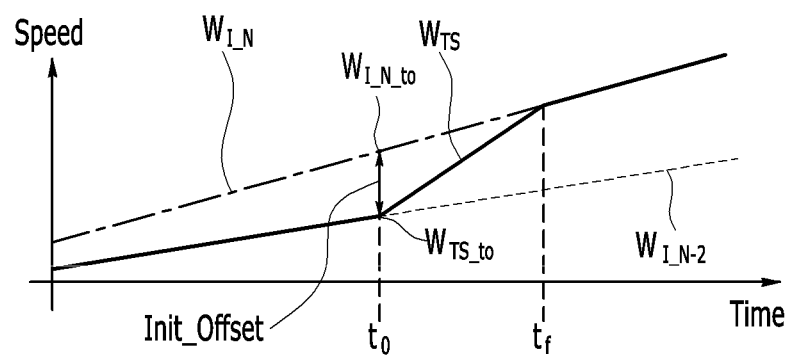
FIG. 8 is a graph for describing a method for generating a target speed of a torque source of FIG. 7.
Figure 9:
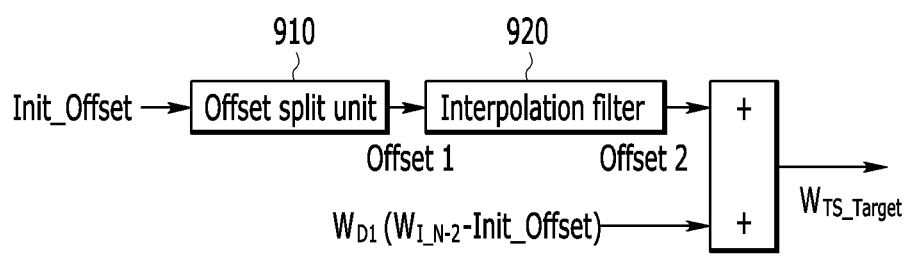
FIG. 9 is an exemplified diagram for describing the method for generating a target speed of a torque source of FIG. 7.

FIG. 7 is a flow chart of a method for generating a targeted speed of a torque source in the shift control method according to the exemplary form of the present disclosure, FIG. 8 is a graph for describing a method for generating a targeted speed of a torque source of FIG. 7, and FIG. 9 is an exemplified diagram for describing the method for generating a targeted speed of a torque source of FIG. 7.

Referring to FIG. 7, the vehicle controller 200 maintains the second clutch connected to the next stage driving gear in the slip state (S710). That is, the vehicle controller 200 controls the actuator 430 to supply a predetermined amount of oil pressure to the second clutch connected to the next stage driving gear, to thereby maintain the second clutch in the slip state. Here, the predetermined amount represents the amount of oil pressure for maintaining the second clutch in the slip state and may be a preset value.

The vehicle controller 200 uses an inertia and the target speed of the input shaft of the transmission 150 to generate a set value (S720). That is, the vehicle controller 200 may generate the set value based on the following [Equation 3].

$$\alpha = J * \frac{d}{dt}(W_{TS\_Target}) \quad \text{[Equation 3]}$$

In the above Equation 3, a may represent the set value, J may represent the inertia of the input shaft of the transmission 150, and $W_{TS\_Target}$ may represent the target speed of the torque source 100. Here, the inertia of the input shaft of the transmission 150 may accurately represent the entire inertia from the torque source 100 to the input shaft of the transmission 150. The inertia may be differently set depending on the shift stage currently engaged. Further, when the torque source 100 includes the engine and the motor (i.e., in the case of the hybrid vehicle), the inertia may be differently set depending on the coupling of the engine clutch. That is, the inertia of the EV mode and the inertia of the HEV may be different. The inertia may be preset on the basis of the experiment.

The vehicle controller 200 adjusts the input shaft torque of the transmission 150 based on the set value to complete the preparation of the speed control (S730). In other words, the vehicle controller 200 increases and reduces a total of the input shaft torque of the transmission 150 to maintain the total value to be approximately the set value, to thereby complete the preparation of the speed control.

The vehicle controller 200 generates the input shaft speed at the target stage (S740). In detail, as shown in FIG. 8, the vehicle controller 200 generates the input shaft speed at the current stage on the basis of the output shaft speed and the gear ratio of the current stage at set timing $t_0$. That is, the vehicle controller 200 may generate the input shaft speed at the target stage based on the following [Equation 4].

$$W_{I\_N} = W_0 * R_N \qquad [\text{Equation 4}]$$

In the above Equation 4, $W_{I\_N}$ may represent the input shaft speed at the target stage, $W_0$ may represent the output shaft speed, and $R_N$ may represent the gear ratio of the current stage.

Further, the vehicle controller 200 generates the input shaft speed at the target stage on the basis of the output shaft speed and the gear ratio of the target stage at the set timing $t_0$. That is, the vehicle controller 200 may generate the input shaft speed at the target stage based on the following [Equation 5].

$$W_{I\_N-2} = W_0 * R_{N-2} \qquad [\text{Equation 5}]$$

In the above Equation 5, $W_{I\_N-2}$ may represent the input shaft speed at the target stage, $W_0$ may represent the output shaft speed, and $R_{N-2}$ may represent the gear ratio of the current stage.

The vehicle controller 200 generates the initial offset on the basis of the output shaft speed at the target stage and the speed of the torque source at the set timing (S750). Here, the set timing may represent timing at which the set value is generated and then the control of the motor speed starts. In detail, the vehicle controller 200 uses the output shaft speed to calculate the input shaft speed at the target stage at the set timing $t_0$. That is, the vehicle controller 200 may perform a multiplication operation of the output shaft speed $W_{0\_t0}$ at the set timing $t_0$ by the gear ratio $R_{N-2\_t0}$ of the target stage at the set timing $t_0$ to calculate the input shaft speed $W_{I\_N-2\_t0}$ at the target stage.

Further, as illustrated in FIG. 8, the vehicle controller 200 uses the input shaft speed and the speed of the target source to generate an initial offset Init_Offset. That is, the vehicle controller 200 may generate the initial offset Init_Offset based on the following [Equation 6].

$$\text{Init\_Offset} = W_{I\_N-2\_t0} - W_{TS\_t0} \qquad [\text{Equation 6}]$$

In the above Equation 6, the Init_Offset may represent the initial offset, $W_{I\_N-2\_t0}$ may represent the input shaft speed at the target stage at the set timing, and $W_{TS\_t0}$ may represent the speed of the torque source 10 at the set timing $t_0$.

The vehicle controller 200 may use the initial offset and the input shaft speed at the target stage to generate a target speed profile of the torque source 100.

The vehicle controller 200 splits the initial offset Init_Offset to generate an offset input (S760) and interpolates the offset input to generate the interpolated offset input (S770).

First, the vehicle controller 200 includes an offset split unit 910 and an interpolation filter 920, as illustrated in FIG. 9. That is, the offset split unit 910 of the vehicle controller 200 splits the initial offset to generate the offset input offset1. The interpolation filter 920 interpolates the offset input offset1 so that the offset input offset1 is smoothly changed over time to generate an interpolated offset input offset 2.

The interpolation filter 920 may be a low pass filter (LPF) but is not limited thereto. For example, the interpolation filter 920 may use a spline interpolation method, or the like.

Further, as illustrated in FIG. 9, the vehicle controller 200 calculates a difference $W_{D1}$ between the input shaft speed $W_{I\_N-2}$ at the target stage and the initial offset Init_Offset. The vehicle controller 200 calculates the input shaft speed $W_{I\_N-2}$ at the target stage and the target speed of the torque source 100. In other words, the vehicle controller 200 performs the addition operation of the interpolated offset input offset2 and the difference $W_{D1}$ to generate a target speed $W_{TS\_Target}$ of the torque source 100.

Figure 10:
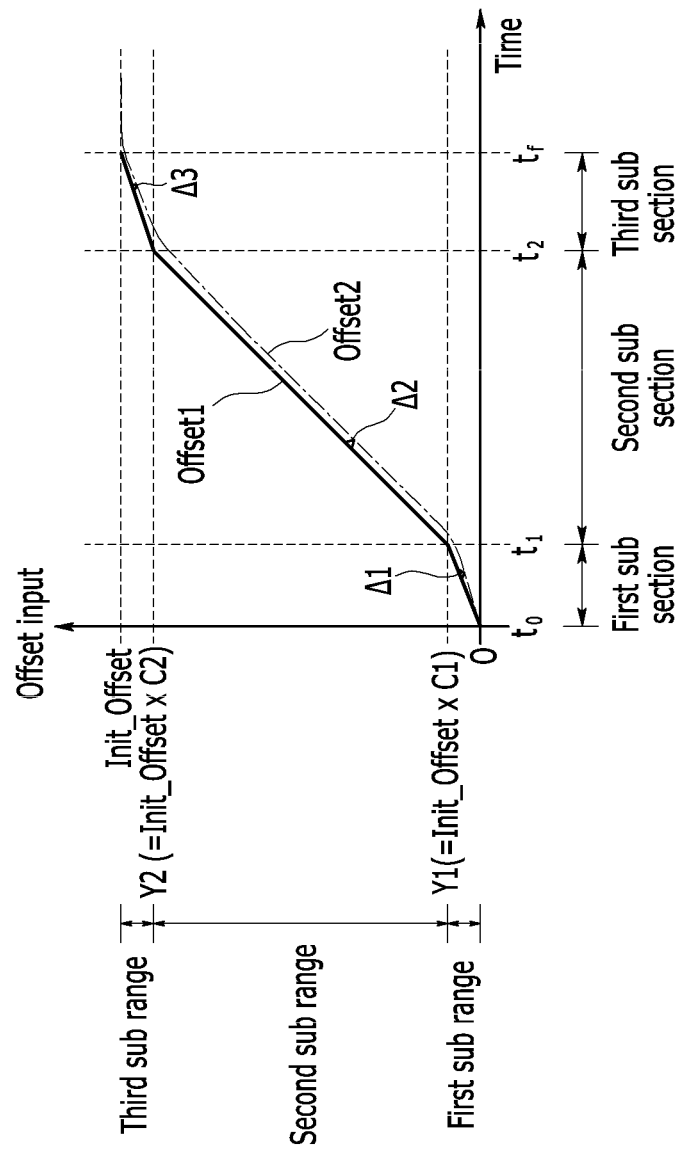
FIG. 10 is a graph for describing an offset input generation in FIG. 7.

FIG. 10 is a graph for describing the offset input generation in FIG. 7.

Referring to FIG. 10, the vehicle controller 200 may split the initial offset Init_Offset to generate the offset input offset1 based on the following two methods.

First, the generation of the offset input offset1 by splitting a range from 0 to the initial offset Init_Offset will be described.

The vehicle controller 200 may split the range from 0 to the initial offset Init_Offset into a plurality of sub ranges. FIG. 10 illustrates that the range up to the initial offset Init_Offset is spilt into three sub ranges, but the present form is not limited thereto. The range from 0 to the initial offset Init_Offset may be split into a larger number of sub ranges or a smaller number of sub ranges.

The vehicle controller 200 may set slopes corresponding to each sub range and generate the offset input offset1 changed depending on the set slope.

For example, the vehicle controller 200 may generate a first value Y1 corresponding to a first set ratio C1 of the initial offset Init_Offset and a second value Y2 corresponding to a second set ratio C2 of the initial offset Init_Offset.

The vehicle controller 200 may generate the offset input offset1 changed by a first slope Δ1 from 0 to the first value Y1. Here, the first slope Δ1 may be set in consideration of a slope Δ1 of the speed of the torque source 100 before the set timing $t_0$. That is, to inhibit or prevent an overshoot of the speed of the torque source 100 after and before the set timing $t_0$, the first slope Δ1 may be set.

If the offset input offset1 becomes the first value Y1, the vehicle controller 200 generates the offset input offset1 changed by a second slope Δ2 from the first value Y1 to the second value Y2. In this case, the second slope Δ2 may be set in consideration of the first slope Δ1 among values satisfying the following [Equation 7].

$$\Delta 2 \leq \frac{\text{Max}TQ}{J} \qquad [\text{Equation 7}]$$

In the above Equation 2, Δ2 may represent the second slope, MaxTQ may represent a maximum torque that the torque source 100 may output in the current driving state, and J may represent the inertia of the input shaft of the transmission 150.

If the offset input offset1 becomes the second value Y1, the vehicle controller 200 generates the offset input offset1 changed by a third slope Δ3 from the second value Y2 to the initial offset Init_Offset. Here, the third slope Δ3 may be determined in consideration of the second slope Δ2 and the slope of the output shaft speed. That is, to inhibit or prevent the overshoot of the speed of the torque source 100 after and before the shift is completed, the third slope Δ3 may be set.

Therefore, the offset input offset1 is generated as a value changed over time. That is, in the case of the down shift control, the offset input offset1 may be increased and in the case of the up shift control, the offset input offset1 may be reduced.

Second, the generation of the offset input offset1 using a method for determining target timing will be described.

The vehicle controller 200 sets the target timing on the basis of the initial offset Init_Offset. The vehicle controller 200 splits a section from the set timing $t_0$ to target timing $t_f$ into a plurality of sub sections. For example, as illustrated in FIG. 10, the vehicle controller 200 may split the section from the set timing $t_0$ to the target timing $t_f$ into three sub sections.

The vehicle controller 200 sets the slope of the offset input offset1 corresponding to each of the three sub sections. The vehicle controller 200 may generate the offset input offset1 changed by the set slope. For example, the plurality of sections may include a first sub section, a second sub section, and a third sub section. To overshoot the speed of the torque source 100 after and before the set timing $t_0$ and after and before the target timing $t_f$, the vehicle controller 200 sets first timing $t_1$ and second timing $t_2$.

In detail, the vehicle controller 200 may set the first slope Δ1 corresponding to the first sub section, the second slope Δ2 corresponding to the second sub section, and the third slope Δ3 corresponding to the third sub section, similarly to the method for splitting a range from 0 to the initial offset Init_Offset.

In other words, the vehicle controller 200 may set the first slope 41 in consideration of the slope of the speed of the torque source 100 before the initial timing and the may set the second slope Δ2 in consideration of the first slope Δ1 among values satisfying the above [Equation 7]. Further, the vehicle controller 200 may set the third slope Δ3 in consideration of the second slope Δ3 and the output shaft speed Wo. That is, the initial offset Init_Offset, the set timing $t_0$, and the target timing $t_f$ are the set values, and therefore the vehicle controller 200 may set the first slope Δ1 and the second slope Δ2 based on the following [Equation 8] and [Equation 9].

Init_Offset=Δ1*($t_1-t_0$)+Δ2*($t_2-t_1$)+Δ3*($t_f-t_2$)  [Equation 8]

$t_2=c_3*t_1$  [Equation 9]

In the above Equations 8 and 9, Init_Offset may represent the initial offset, Δ1 may represent the first slope in the first sub section, $t_1$ may represent the first timing, $t_0$ may represent the set timing, Δ2 may represent the second slope in the second sub section, $t_2$ may represent the second timing, Δ3 may represent the third slope in the third sub section, and $t_f$ may represent the target timing. Further, c3 may represent a preset value and may be set to be a ratio determined by a person having an ordinary skill in the art based on the experiment.

The vehicle controller 200 generates the offset input that is changed by the first slope Δ1 from the set timing $t_0$ to the first timing $t_1$, the second slope 41 from the first timing $t_1$ to the second timing $t_2$, and the third slope Δ3 from the second timing $t_2$ to the target timing $t_f$.

Therefore, the offset input may be generated as a value changed over time. That is, in the case of the down shift control, the offset input may be increased and in the case of the up shift control, the offset input may be reduced.

Meanwhile, FIG. 10 describes, for example, the split into three sub sections, but the present form is not limited thereto. Therefore, the number of sub sections from the initial timing to the target timing may be larger or smaller than three.

Figure 11:
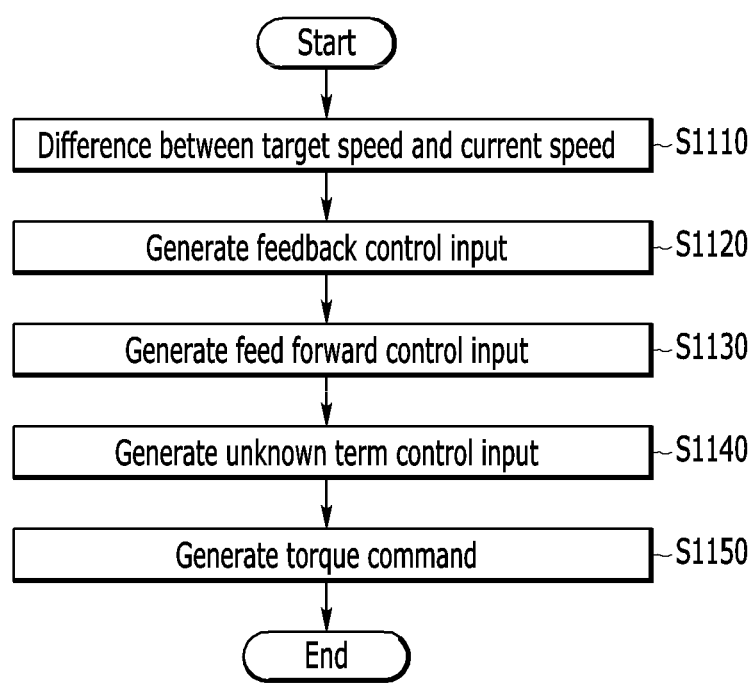
FIG. 11 is a flow chart of the method for controlling a target speed of a torque source in the shift control method according to one form of the present disclosure.
Figure 12:
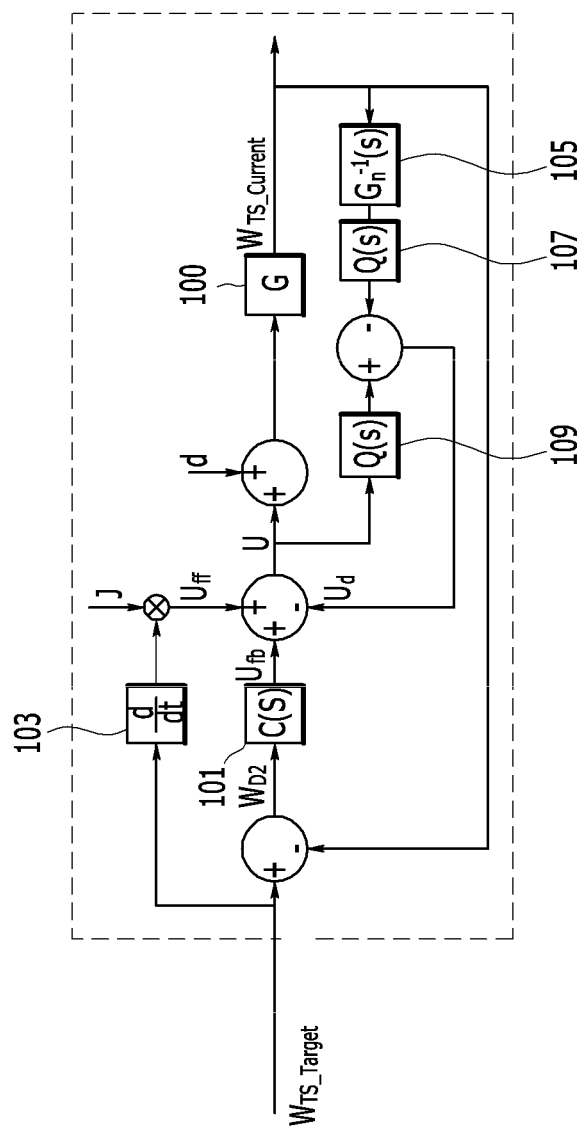
FIG. 12 is an exemplified diagram for describing the method for controlling a target speed of a torque source of FIG. 11.

FIG. 11 is a flow chart of the method for controlling a targeted speed of a torque source in the shift control method according to the exemplary form of the present disclosure and FIG. 12 is an exemplified diagram for describing the method for controlling a targeted speed of a torque source of FIG. 11.

Referring to FIGS. 11 and 12, the vehicle controller 200 calculates a difference $W_{D2}$ between the target speed $W_{TS\_Target}$ of the torque source 100 and a current speed $W_{TS\_Current}$ of the torque source 100 (S1110). In this case, the vehicle controller 200 may receive the current speed $W_{TS\_Current}$ of the torque source 100 from the torque source speed detector 427 and may confirm the current speed $W_{TS\_Current}$.

The vehicle controller 200 uses the difference $W_{D2}$ between the target speed $W_{TS\_Target}$ of the torque source 100 and the current speed $W_{TS\_Current}$ to generate a feedback control input $U_{fb}$ (S1120). In other words, the vehicle controller 200 uses the difference using the feedback controller 101 to generate the feedback control input. In this case, the feedback controller 101 may be a proportional integral derivative (PID) controller that receives the difference $W_{D2}$ to output the feedback control input $U_{fb}$. Meanwhile, as long as the feedback controller 101 may output the feedback control input, any kind of feedback controller may be used.

The vehicle controller 200 uses an inertia J of the input shaft of the transmission 150 and the target speed $W_{TS\_Target}$ of the torque source 100 to generate a feed forward control input $U_{ff}$ (S1130). In other words, the vehicle controller 200 uses a differentiator 103 to generate a derivative. Here, the differentiator receives the target speed $W_{TS\_Target}$ of the torque source 100 and outputs a derivative of the received target speed $W_{TS\_Target}$. Further, the vehicle controller 200 may perform a multiplication operation of the inertia J and the derivative to generate the feed forward control input $U_{ff}$.

To remove an unknown term d, the vehicle controller 200 uses a nominal inverse model 105 and at least one low pass filter Q(s) 107 and 109 based on the current speed $W_{TS\_Current}$ of the torque source 100 to generate an unknown term control input $U_d$ (S1140). Here, the low pass filters 107 and 109 may be designed based on the following [Equation 10].

$$Q(s) = \frac{\sum_{g=1}^{m} b_g s^g}{\sum_{h=1}^{n} a_h s^h}$$  [Equation 10]

In the above Equation 10, Q(S) may represent the low pass filter and $a_h$ and $b_g$ may represent a design parameter and may be designed to satisfy the following [Equation 11] equal to or less than a maximum frequency $\omega_m$ included in the unknown term d.

$$|Q(s=j\omega)|_{\omega \leq \omega_m} \approx 1$$

Further, the nominal inverse model $G_n^{-1}(s)$ may be set to satisfy the following [Equation 12].

$G_n^{-1}(s)=J \times s$  [Equation 12]

In the above Equation 12, $G_n^{-1}(s)$ may represent the nominal inverse model and J may represent the inertia of the input shaft of the transmission 150.

That is, a nominal model Gn(s) of the torque source 100 may be designed to satisfy the following [Equation 13].

$$G_n(s) = \frac{1}{J * S} \quad \text{[Equation 13]}$$

Next, the vehicle controller 200 uses the nominal inverse model 105 and the low pass filters 107 and 109 to generate the unknown term control input $U_d$ on the basis of the current speed $W_{TS\_Current}$ of the torque source 100.

The vehicle controller 200 uses a feedback control input $U_{fb}$, the feed forward control input $U_{ff}$, and the unknown term control input $U_d$ to generate a torque command U (S1150). In this case, the torque source 100 generates a torque according to the torque command. In the case of the hybrid vehicle in which the torque source 100 includes the engine and the motor, the torque command U may be appropriately distributed to the engine and the motor.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A shift control apparatus of a vehicle, comprising:
   a torque source configured to generate power for driving the vehicle;
   a transmission configured to selectively receive the power of the torque source through a first clutch or a second clutch and configured to convert and output the power;
   a data detector configured to detect a vehicle state data to control the transmission; and
   a vehicle controller configured to connect a synchronizer to a driving gear of a next stage when the vehicle state data satisfy a shift condition, release the first clutch connected to a driving gear of a current stage, perform a speed control of the torque source while maintaining a second clutch connected to the driving gear of the next stage in a slip state, and release the second clutch and connect the first clutch when the vehicle stage data satisfy a speed control completion condition to complete a shift to a target stage.

2. The shift control apparatus of claim 1, wherein the vehicle controller uses an inertia and a target speed of an input shaft of the transmission to generate a set value, and the vehicle controller is configured to increase or reduce an input shaft torque of the transmission based on the set value to prepare the speed control of the torque source.

3. The shift control apparatus of claim 1, wherein the vehicle controller generates an input shaft speed at the target stage at time when the speed control of the torque source starts, uses the input shaft speed and a torque source speed at the target stage to generate an initial offset, and the vehicle controller splits the initial offset to generate an offset input, and interpolates the offset input to generate the interpolated offset input.

4. The shift control apparatus of claim 3, wherein the vehicle controller sets a target timing based on the initial offset, splits a section from the time when the speed control of the torque source starts from a target time into a plurality of sub sections, and sets a slope of the offset input corresponding to the plurality of sub sections, respectively.

5. The shift control apparatus of claim 1, wherein the vehicle controller uses at least one of a target speed of the torque source, a current speed of the torque source, and an inertia of an input shaft of the transmission to generate at least one of a feedback control input, a feed forward control input, and an unknown term control input and uses at least one of the feedback control input, the feed forward control input, and the unknown term control input to generate a torque command.

6. The shift control apparatus of claim 1, wherein the vehicle controller uses an output speed and a gear ratio of the transmission to generate a speed of an input shaft connected to the first clutch and releases the second clutch and connects the first clutch when a difference value between the speed of the torque source and the speed of the input shaft connected to the first clutch is equal to or less than a first reference value.

7. The shift control apparatus of claim 1, wherein the vehicle controller uses an output speed and a gear ratio of the transmission to generate an acceleration of an input shaft connected to the first clutch and releases the second clutch and connects the first clutch when a difference value between an acceleration of the torque source and the acceleration of an input shaft connected to the first clutch is equal to or less than a second reference value.

8. A shift control method of a vehicle including a transmission selectively receiving power of a torque source through a first clutch or a second clutch and converting and outputting the power, the shift control method comprising:
   determining whether a shift condition is satisfied based on vehicle state data;
   connecting a next stage synchronizer and releasing a first clutch connected to a current stage driving gear, when the shift condition is satisfied;
   releasing a current stage synchronizer and coupling a target stage synchronizer;
   generating a target speed of the torque source while maintaining a second clutch connected to a next stage driving gear in a slip state;
   performing a speed control of the torque source by using the target speed of the torque source;
   determining whether a speed control completion condition is satisfied; and
   releasing the second clutch connected to the next stage driving gear and connecting the first clutch connected to a target stage driving gear, when the speed control completion condition is satisfied.

9. The shift control method of claim 8, wherein the generating of the target speed of the torque source includes:
   maintaining the first clutch connected to the next stage driving gear in a slip state;
   generating a set value by using an inertia and a target speed of an input shaft of the transmission; and
   adjusting an input shaft torque of the transmission based on the set value.

10. The shift control method of claim 9, wherein the set value is generated based on the following Equation:

$$\alpha = J * \frac{d}{dt}(W_{TS\_Target})$$

where, α represents the set value, J represents the inertia of the input shaft of the transmission, and $W_{TS\_Target}$ represents the target speed of the torque source.

11. The shift control method of claim 8, wherein the generating of the target speed of the torque source includes:
   generating a input shaft speed at a target stage at a set time;
   generating an initial offset by using the input shaft speed and a speed of the torque source at a target stage;
   generating an offset input by splitting the initial offset; and
   generating an interpolated offset input by interpolating the offset input.

12. The shift control method of claim 11, wherein the splitting of the initial offset to generate the offset input includes:
   setting a target time based on the initial offset;
   splitting a section from the set time to the target time into a plurality of sub sections; and
   setting a slope of the offset input corresponding to the plurality of sub sections, respectively.

13. The shift control method of claim 12, wherein the plurality of sub sections include first to third sections.

14. The shift control method of claim 13, wherein a first slope of the offset input corresponding to the first section is set based on the speed of the torque source at the set time and a third slope of the offset input corresponding to the third section is set based on the slope of the offset input corresponding to the second section and a slope of a speed of an output shaft of the transmission.

15. The shift control method of claim 14, wherein a second slope of the offset input corresponding to the second section is set based on the first slope among values satisfying the following Equation:

$$\Delta 2 \leq \frac{\text{Max}TQ}{J}$$

where, Δ2 represents the second slope, MaxTQ represents a maximum torque that the torque source 100 outputs in the current driving state, and J represents the inertia of the input shaft of the transmission.

16. The shift control method of claim 8, wherein the performing of the speed control of the torque source includes:
   calculating a difference between the target speed of the torque source and a current speed of the torque source;
   generating a feedback control input by using the difference between the target speed of the torque source and the current speed of the torque source;
   generating a feed forward control input by using an inertia of an input shaft of the transmission and the target speed of the torque source;
   generating an unknown term control input by using a nominal inverse model and at least one low pass filter based on the current speed of the torque source; and
   generating a torque command by using at least one of the feedback control input, the feed forward control input, and the unknown term control input.

17. The shift control method of claim 16, wherein the nominal inverse model is designed based on the following Equation:

$$G_n^{-1}(s) = J \times s$$

where, $G_n^{-1}(s)$ represents the nominal inverse model and J represents the inertia of the input shaft of the transmission.

18. The shift control method of claim 16, wherein the low pass filter is designed based on the following Equation:

$$Q(s) = \frac{\sum_{g=1}^{m} b_g s^g}{\sum_{h=1}^{n} a_h s^h}$$

where, Q(S) represents the low pass filter and $a_h$ and $b_g$ represent design parameters and are set to satisfy Equation of $$|Q(s = j\omega)|_{\omega \leq \omega_m} \approx 1$$

at a maximum frequency $\omega_m$ or less included in the unknown term.

19. The shift control method of claim 8, wherein the determining whether the speed control completion condition is satisfied includes:
   generating a speed of an input shaft connected to the first clutch by using an output speed and a gear ratio of the transmission; and
   determining whether a difference value between the speed of the torque source and the speed of the input shaft connected to the first clutch is equal to or less than a first reference value.

20. The shift control method of claim 8, wherein the determining whether the speed control completion condition is satisfied includes:
   generating a speed of an input shaft connected to the first clutch by using an output speed and a gear ratio of the transmission;
   generating an acceleration of the input shaft connected to the first clutch by using the speed of the input shaft connected to the first clutch; and
   determining whether a difference value between an acceleration of the torque source and the acceleration of the input shaft connected to the first clutch is equal to or less than a second reference value.

* * * * *